Nov. 5, 1957 P. RETHORET 2,811,874
CHAIN SAW GRINDERS
Filed Nov. 1, 1955 3 Sheets-Sheet 1
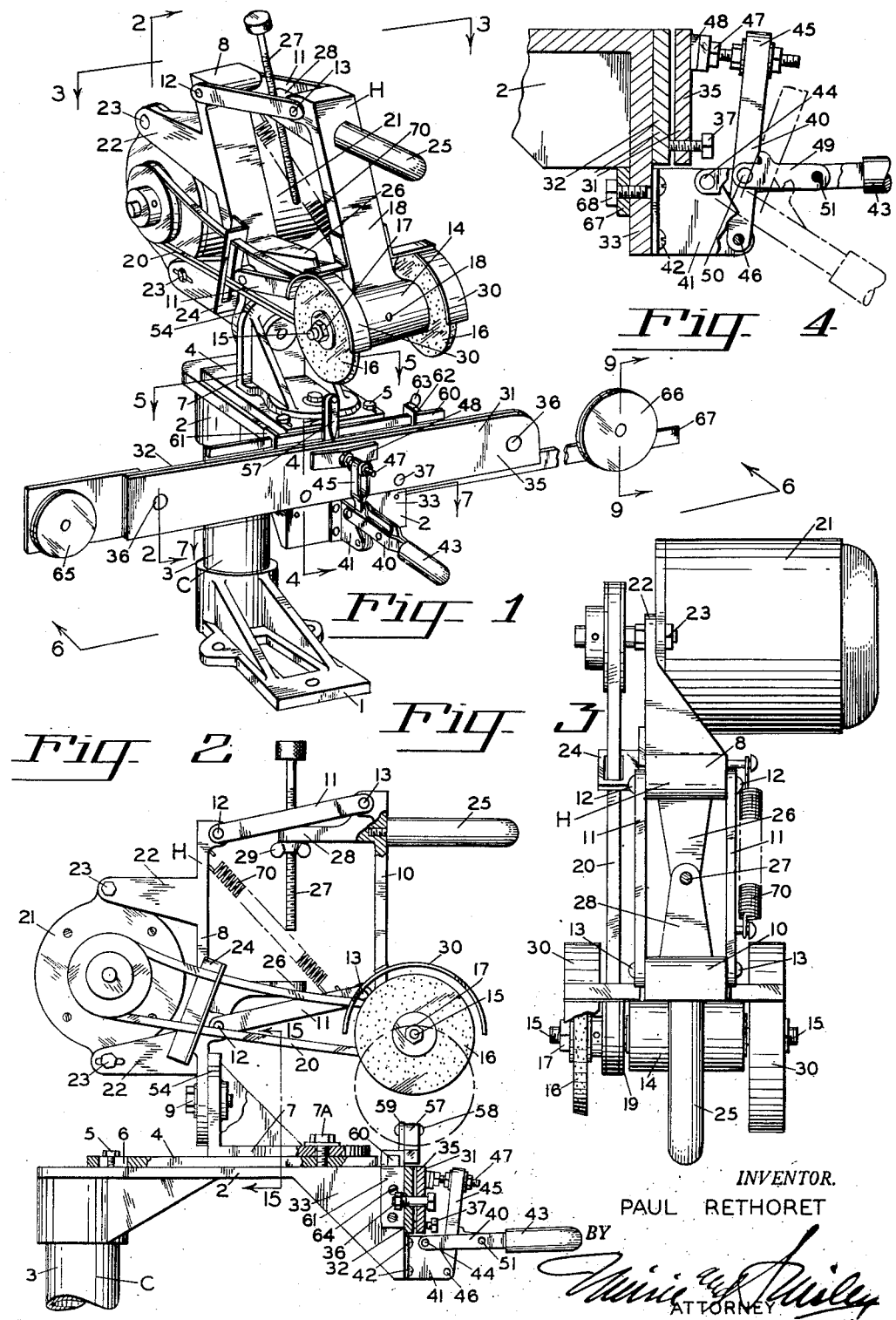
INVENTOR.
PAUL RETHORET

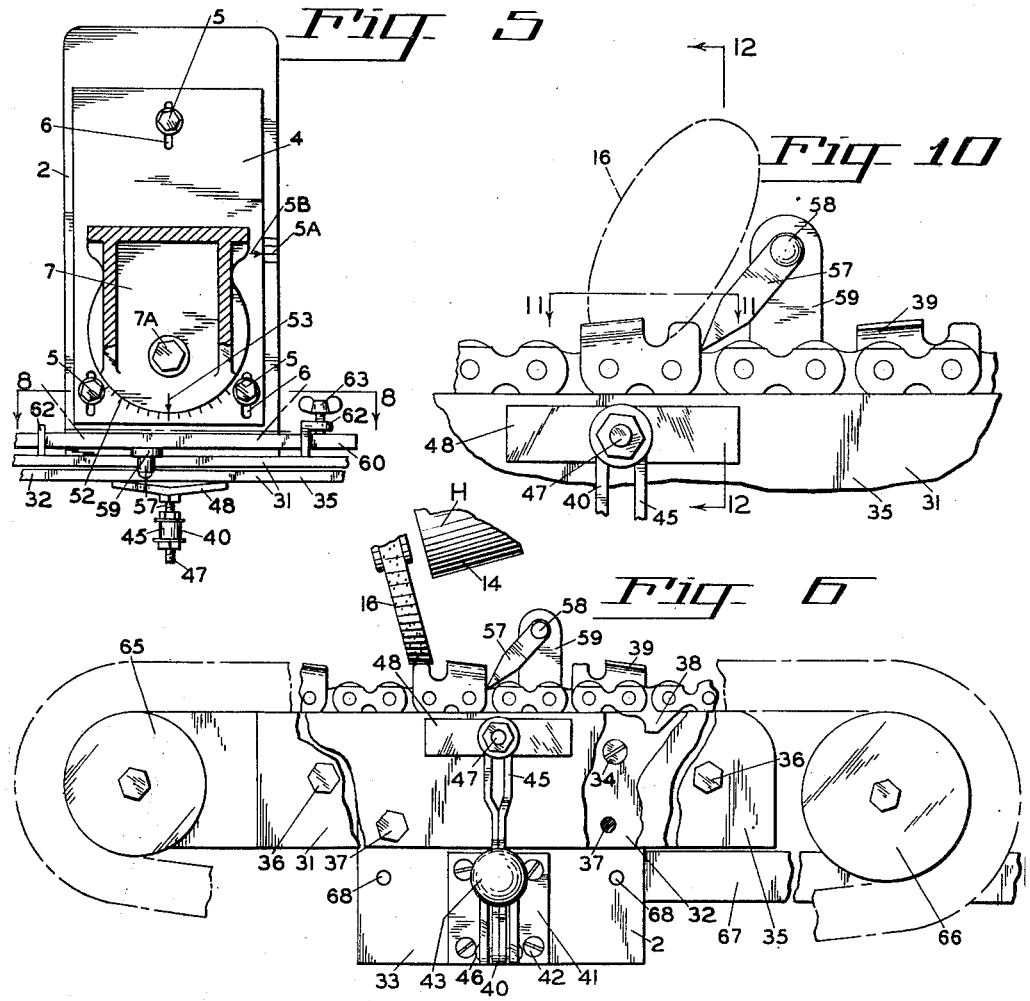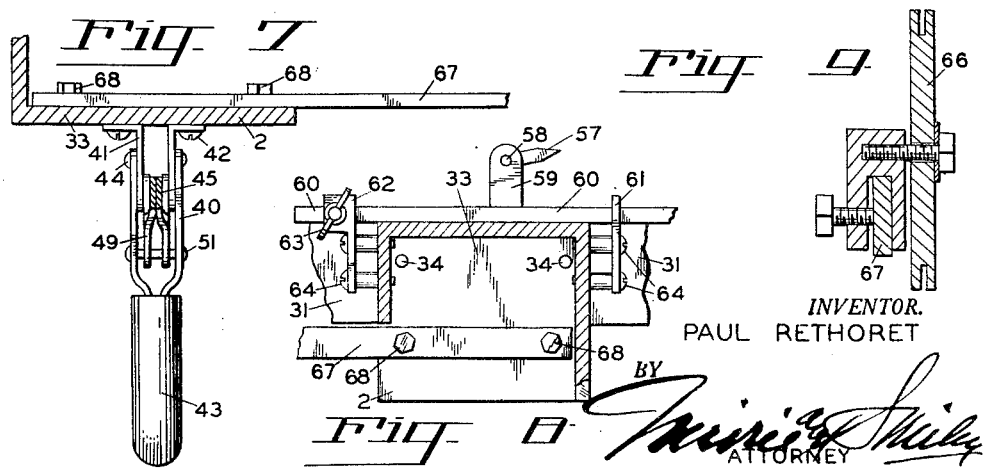

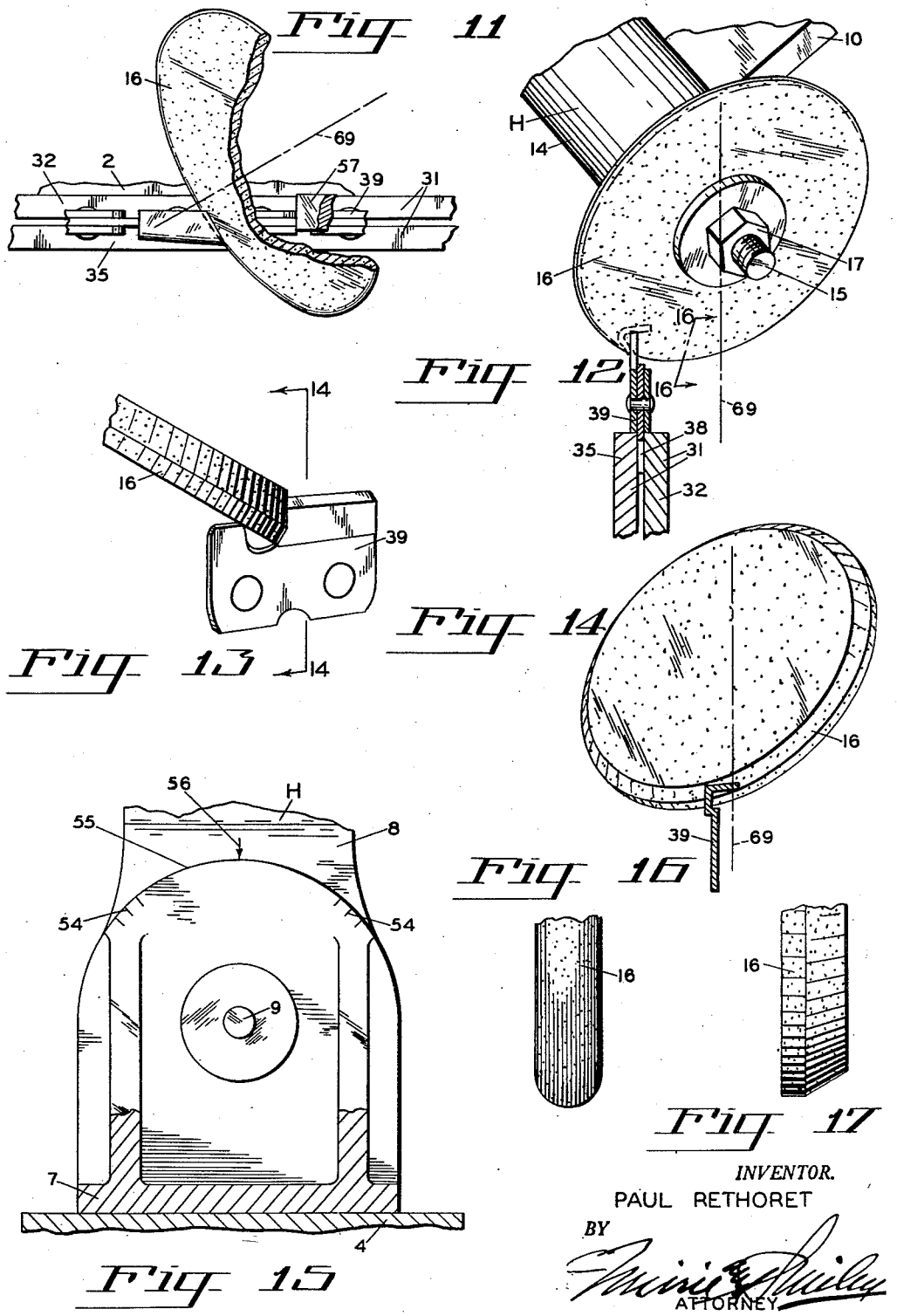

United States Patent Office

2,811,874
Patented Nov. 5, 1957

2,811,874

CHAIN SAW GRINDERS

Paul Rethoret, Vida, Oreg.

Application November 1, 1955, Serial No. 544,135

7 Claims. (Cl. 76—40)

The present invention relates to chain saw grinders for grinding the teeth of chain saws.

The primary object of the invention is in the provision of a grinding machine for chain saw teeth possessing novel structural characteristics for adjusting the lateral and the longitudinal angles of the grinder relative to the saw teeth and for positively controlling the depth of cut of the grinder into the saw teeth.

A very important object lies in the provision of a novel grinder head and frame construction whereby the grinder head is moved generally vertically relative to its carrying frame in such a manner that the operation of the grinder is directly controlled in response to the upward and downward movement of the grinder head.

A further object of the invention ancillary to the preceding object is in the provision of a grinder head and motor orientation in a grinding machine wherein the grinding wheels carried by the head are driven through a pulley belt to a motor in such relation that the pulley is tightened and rotated as the grinding head is moved toward the chain saw to be ground and braked and slackened as the grinding head is moved away from the chain saw to be ground.

A still further object of the invention is in the provision of a grinding machine which will position the teeth in identical positions relative to the grinding head so that each tooth is ground in an identical manner.

A still further object of the invention is in the provision of a means for positively limiting the depth of the cut of the grinding head which interengages the grinding head carrier and supporting frame in a novel manner.

The novel features that are considered characteristic of the invention are set forth with particularly in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Fig. 1 is a front perspective view of the grinding machine of the invention;

Fig. 2 is a side elevational view of the grinder taken substantially along the plane of section line 2—2 of Fig. 1;

Fig. 3 is a top plan view of the grinder taken substantially along the plane of section 3—3 of Fig. 1;

Fig. 4 is an enlarged detail view in cross section of a portion of the chain saw supporting or carrying means of the grinding machine;

Fig. 5 is a cross sectional view through the base of the grinding machine taken substantially along the plane of section line 5—5 of Fig. 1;

Fig. 6 is an enlarged detail view of the front of the chain saw supporting means taken along the plane of section line 6—6 of Fig. 1, the parts being broken away for convenience of illustration of the grinding wheel grinding the rider of a saw tooth;

Fig. 7 is a fragmentary, detail view in cross section taken substantially along the plane of section line 7—7 of Fig. 1;

Fig. 8 is a detail view from the rear of the chain saw supporting means taken substantially along the plane of section line 8—8 of Fig. 5;

Fig. 9 is a sectional view of a detail of construction taken substantially along the plane of section line 9—9 of Fig. 1;

Fig. 10 is a greatly enlarged view of a section of a saw chain moving over the chain supporting structure of the machine illustrating the grinder in phantom outline engaging a chain saw cutting tooth of the round type;

Fig. 11 is a fragmentary plan view taken substantially along the plane of section line 11—11 of Fig. 10;

Fig. 12 is an enlarged and perspective view of the grinding wheel of Fig. 10 engaging a saw tooth taken substantially along the plane of section line 12—12 of Fig. 10;

Fig. 13 illustrates the position of a grinding wheel of the machine for grinding a chisel-type saw tooth;

Fig. 14 is a view similar to Fig. 13 taken along the plane of section line 14—14 of Fig. 13;

Fig. 15 is an enlarged, front view of a portion of the grinding machine base and the supporting frame attachment thereto illustrating how the frame is pivotally supported on the base;

Fig. 16 illustrates a modification of a grinder wheel, and

Fig. 17 illustrates another modification of a grinder wheel.

Referring first in detail to Figs. 1 through 4, there is disclosed a column C having its lower end seating in the socket of a base 1. A platform 2 is mounted on the top of the column C, which column C is provided with an intermediate, adjustable portion 3 for raising and lowering the same whereby the height of the platform 2 may be varied. A reinforcing plate 4 is mounted on the top of the platform 2 through the medium of screws 5 which screws pass through the slots 6 of the reinforcing plate whereby the reinforcing plate is capable of transverse movement between the sides of the platform 2 for reasons which will become more fully apparent as the description proceeds.

Rotatably mounted on the reinforcing plate 4 is a grinding machine base 7, which base is generally L-shaped comprising a horizontal leg resting flat upon the reinforcing plate 4, and a vertical leg extending upwardly from one edge thereof and being rigidified by integral gussets interengaging the legs. Locking bolt 7a rotatably or pivotally mounts the horizontal leg of the base 7 on the reinforcing plate 4 and to the vertical leg of the base 7 is attached a grinding machine supporting frame H which includes a rigid vertical frame 8 pivotally attached to the vertical leg of the base 7 by a locking bolt 9. A secondary frame member 10 is connected to the frame 8 through the medium of parallel links 11. The secondary frame member 10 is in the form of an elongated bar as is the rigid frame member 8. The secondary frame member 10 is disposed generally parallel to the frame member 8 and forwardly thereof with a pair of links 11 attaching the upper ends of the frame members 8 and 10 to one another and a pair of lower links 11 attaching the lower portions of these members to one another. Pivotal connections 12 and 13 attach the forward and rearward ends of the links to the members 10 and 8. With this construction, it will be seen that the frame member 10 is movable in a generally parallel path relative to the fixed frame member 8 toward and away from the platform 4.

At the lower end thereof, the secondary frame member 10 is provided with a head 14 having a transverse bore therethrough journalling a driven shaft 15 therein. Grinding wheels 16 are keyed or otherwise fixed to the opposite ends of the shaft 15 by means of locking nuts 17. In order to prevent rotation of the shaft 15 when tightening or loosening the nut 17, the head 14 has a hole 18 drilled therethrough so that a pin can be passed therethrough into engagement with the shaft 15.

Extending rearwardly from the frame member 8 are a pair of upper and lower brackets 22 which clamp a driving motor 21 therebetween by means of bolts 23. The driving motor is provided with a drive shaft upon which is keyed a pulley wheel. A driven pulley wheel 19 is mounted on the driven shaft 15 and a V belt 20 is entrained over the pulley wheels to drive the grinding head shaft 15. Securely fixed to the frame member 8 and extending from one side thereof is a belt guide 24 which acts in conjunction with the parallel link mounting of the secondary frame member to the frame member 8 to start and stop the rotation of the grinding wheels 16 as the secondary frame member 10 is moved upwardly and downwardly. Thus, as the secondary frame member 10 is moved downwardly toward the platform 4 from the position shown in Figs. 1 and 2 the belt 20 is tightened and moved out of frictional engagement with the belt guide 24 whereby the shaft 15 is positively driven and the grinding wheels rotated therein. As the secondary frame member is lifted upwardly through the medium of the operating handle 25 projecting forwardly therefrom, the frame member 10 is moved closer to the frame member 8, the pulley slackened by virtue of this movement and positive friction exerted on the belt 20 by the belt guide 24 to stop rotation of the belt 20 and consequently of the grinding rollers or wheels 16.

In order to control the downward movement of the grinder head or grinding head which may be considered that portion of the secondary frame member 10 consisting of the head 14 carrying the grinding wheels 16, the secondary frame member 10 is provided with a rearwardly extending bracket 28 projecting rearwardly from the upper end thereof. The bracket 28 is provided with a vertical, threaded bore through the free end portion thereof through which is threaded an adjusting bolt 27, a wing nut 29 being threaded on the adjusting bolt on the portion thereof below the bracket 28 to fix the same in adjusted positions.

The lower portion of the rigid frame member 8 is provided with a forwardly extending bracket 26 which is disposed in the path of movement of the adjusting bolt 27 as the grinding head 14 is moved downwardly upon movement of the operating handle 25 so that the downward limit of such movement is positively controlled by the abutment of the lower end of the adjustment bolt 27 with the bracket 26. The degree of adjustment of this bolt 27 may be controlled by the positioning of the wing nut 29 on the bolt. Normally maintaining the secondary frame member 10 in an upward position relative to the platform 2 upon which the machine is mounted is an elongated coil spring 70 reacting at its upper end on the upper portion of the frame member 8 and at its lower end on the lower end of the secondary frame member 10 so that it constantly urges the frame member 10 in an upward direction. Suitable grinding guards 30 are provided over the grinding wheels 16 to guard the operator from sparks and the like and operate with the self shut off feature occasioned by the raising of the grinding head as a safety device for the operator.

A means is provided for supporting a chain saw to be ground by the grinding wheels 16 in the form of a clamp assembly 31 mounted on the front end of the platform 2, which front end is in the form of a bracket 33. Fixedly secured to the vertical face of the bracket 33 is a transverse bar or plate 32, the securement being effected by means of counter sunk screws 34 (Fig. 6). A second clamp bar or plate 35 is secured to the face of the fixed plate 32 by means of bolts 36. The plate 35 is movable toward and away from the plate 32 on the bolts 36. Also threaded through the plate 35 are adjustable screws 37 which adjust the spacing of the plate 35 relative to the plate 32 to provide a guide groove between these plates appropriate to the thickness of the chain saw to be ground.

As shown most clearly in Figs. 6 and 11, guides 38 of the chain saw 39 are clamped between the plates 32 and 35 with the links of the chain riding on the upper edges of the plates and the guides 38 of the chains riding between the plates. The final clamping of the plates after the chain is in place is accomplished by the over center action of the clamp mechanism 40, illustrated particularly in Figs. 4 and 7.

The clamping mechanism 40 comprises a bracket 41 which is secured below the plates 32 and 35 on the bracket 33 through the medium of screws 42. A lever 43 is pivotally connected to the bracket 41 by means of the pivot pin 44. A second lever or bar is pivoted as at 46 to the lower end of the bracket 41 below the pivot point 44 and the bar 45 extends upwardly past the lever 43. At its upper end, the bar 45 is provided with an adjustable finger 47 which is adapted to engage the face of the clamping plate 35. Pressure is applied to this finger by means of a toggle link 49 which has one of its ends pivotally connected to the second lever or bar 45 as at 50 and to the first lever 43 as at 51 whereby an over center clamping action is provided as the lever 43 is raised pressing the finger 47 into engagement with the plate 35 of the chain saw supporting structure.

In the mounting of the chain saw to the chain saw supporting unit 31 the chain of the saw is entrained over the guide rollers 65 and 66 at the opposite ends of the guide bar structure formed by the plates 32 and 35. One of the rollers, the roller 66, is adjustably mounted on a leg 67 extending longitudinally beyond the one end of the clamping plate structure so that the chain saw supporting means can accomomdate various lengths of chains. Bolts 68 clamp the leg 67 to the bracket 33.

In order to set the positioning of the base 7 relative to the platform 2, the reinforcing plate 4 on the platform 2 is provided with degree markings 52 cooperating with a pointer 53 fixed to the base 7. The cooperation of the pointer with the degree markings 52 indicate to the operator the radial angle of the grinding head 14, or to put it another way, the angle of the grinding wheels to the chain saw, making it possible to accurately position the angle of the grinder wheels 16 to the chain saw while grinding either to the right or left of the saw making an exact duplicate grind in each of these two positions.

With specific reference to Fig. 15, there is illustrated how the cutting angle of the teeth are determined. For this determination, the vertical frame number 8 of the grinding machine is provided with a pointer marker which operates with degree marks 54 on the vertical leg of the base 7. These marks indicate to the operator the vertical angle of the grinding head which angle determines the cutting angle of the face of the cutter teeth of the chain saw. The marks 54 are both to the right and left of the pointer mark 56 so that both right and left cutting angle readings can be made.

Figs. 11 and 12 indicate the position of the grinding head while the grinding machine is grinding the cutting faces of rounded type teeth. Figs. 13 and 14 disclose the grinding wheels 16 being utilized to grind the chisel or square type cutter teeth. Obviously, by virtue of the vertical and lateral angular adjustability of the grinding wheels relative to the saw teeth, any desired angle can be obtained which angle can be enhanced, changed and shaped by particular shapes of the grinding wheel edges. Although some of these grinding wheel edge shapes are shown in Figs. 16 and 17, it is to be understood that these showings are merely illustrative and not limiting.

In order to position the teeth of the saw for uniform grinding on the saw supporting clamp structure 32, 35, an adjustable index stop or pawl 57 is provided, the mounting of which is most clearly apparent in Figs. 1, 5, 6, 8 and 10. To accomplish this mounting, at longitudinally spaced points therealong projecting from the rear face thereof, the fixed clamping bar 31 is provided with a pair of rearwardly extending lugs 62. These lugs have registering guide apertures through which an elongated bar 60 is slidably disposed. One of the lugs 62 is provided with an inturned ear having a threaded bore through which a set screw 63 extends so that the bar 60 may be locked in any desired position. A standard 59 extends upwardly from an intermediate portion of the bar. The pawl 57 is swingably mounted on the upper end of the standard 59 by means of the pin 58. The pawl slides over the saw teeth 39 as the chain is moved in one direction and prevents movement of the saw teeth in the opposite direction by wedging between the saw and the chain when such movement is attempted. Thus, to positively position each of the teeth 39, as the chain is moved, each tooth is moved to lift the pawl so that the pawl falls therebehind and the chain backed off until the tooth is in abutment with the pawl. Through this maneuvering, each tooth 39 is identically positioned relative to the grinding wheel 16 of the grinding mechanism.

In the operation of the device, the frame H is first adjusted on the vertical portion of the base 7 by loosening the bolt 7a bolting the base 7 to the reinforcing plate 4 and rotating this base to the desired position indicated by the pointer 53 with regard to the scale 52. The next adjustment is to tilt the frame H at an angle to the vertical by loosening the bolt 9 and tilting the frame member 8 and consequently the secondary frame member 10 and the grinding head 14 until the pointer 56 on the frame member 8 registers with the desired degree mark 54 on the vertical leg of the base 7. This bolt 9 is then tightened down, holding the grinding head at its desired angle both vertically and horizontally relative to the chain saw.

Next, the chain saw is placed between the clamping bars 32 and 35 with the guide members 38 of the saw being guidably clamped between the bars by the operation of the over center clamping mechanism described with reference to Figs. 4 and 7. Further, the chain is entrained over the idler wheels 65 and 66, idler 66 being adjusted to loosely hold chains of various lengths while the teeth thereof are being ground.

To adjust the depth of cut of the grinding wheels, the adjusting screw 27 is screwed to the desired position so that it strikes the bracket 26 at the desired downward limit of movement of the grinding wheel 16.

Next, the index pawl 57 is adjusted behind the tooth being ground as best indicated in Fig. 6, this adjustment being carried out by sliding the bar 60 to the proper position and tightening the same in such position.

When the foregoing operations have been carried out, the operator of the grinder grasps the handle 25 pulling the grinding wheel 16 down into the teeth of the saw and causing the wheel to rotate by virtue of the tightening action of the belt 20 and the release of braking friction thereon during the downward movement of the head 14.

The position of the center line of the grinding wheel 69 may be easily determined with regard to its location with reference to the chain saw and moved as desired by moving the reinforcing plate 4 toward and away from the center of the saw, which movement may be accomplished by loosening the cap screws 5 and observing the scale 5a formed on the base platform 2 with reference to the pointer marks 5b located on the reinforcing plate 4. After the desired adjustment is made, the cap screws 5 are again tightened in place.

Although a certain specific embodiment of the invention has been shown and described, it is obvious that many modifications thereof are possible. The invention, therefore, is not to be restricted except in so far as is necessitated by the prior art and by the spirit of the appended claims.

What I claim is:

1. A chain saw grinder comprising a platform, means carried by said platform for supporting a chain saw, a base mounted on said platform for pivotal movement about an axis perpendicular to said platform, a supporting frame pivotally carried by said base for pivoting movement about an axis angularly related to the pivotal axis of said base, a grinding head disposed above said chain saw supporting means, means movably attaching said grinding head to said supporting frame for movement in a generally vertical direction toward and away from said chain saw supporting means, a driving motor fixedly carried on said frame and having a drive shaft pulley wheel, said grinding head including a grinding wheel keyed to a driven shaft, a pulley wheel keyed to said shaft, and a drive belt entrained over said pulley wheels, a belt guide fixedly attached to said frame, said belt guide frictionally engaging said belt as said grinding head is moved upwardly away from said chain saw supporting means stopping movement of said belt.

2. A chain saw grinder comprising a platform, means carried by said platform for supporting a chain saw, a base mounted on said platform for pivotal movement about an axis perpendicular to said platform, a supporting frame pivotally carried by said base for pivoting movement about an axis angularly related to the pivotal axis of said base, a grinding head disposed above said chain saw supporting means, means movably attaching said grinding head to said supporting frame for movement in a generally vertical direction toward and away from said chain saw supporting means, a driving motor fixedly carried on said frame and having a drive shaft pulley wheel, said grinding head including a grinding wheel keyed to a driven shaft, a pulley wheel keyed to said shaft, and a drive belt entrained over said pulley wheels, a belt guide fixedly attachd to said frame, said belt guide frictionally engaging said belt as said grinding head is moved upwardly away from said chain saw supporting means stopping movement of said belt, said movably attaching means causing said grinding head to move toward said motor as said head is moved upwardly to loosen said drive belt.

3. A chain saw grinder comprising a platform, means carried by said platform for supporting a chain saw, a base mounted on said platform for pivotal movement about an axis perpendicular to said platform, a supporting frame pivotally carried by said base for pivoting movement about an axis angularly related to the pivotal axis of said base, a grinding head disposed above said chain saw supporting means, means movably attaching said grinding head to said supporting frame for movement in a generally vertical direction toward and away from said chain saw supporting means, a driving motor fixedly carried on said frame and having a drive shaft pulley wheel, said grinding head including a grinding wheel keyed to a driven shaft, a pulley wheel keyed to said shaft, and a drive belt entrained over said pulley wheels, a belt guide fixedly attached to said frame, said belt guide frictionally engaging said belt as said grinding head is moved upwardly away from said chain saw supporting means stopping movement of said belt, said movably attaching means causing said grinding head to move toward said motor as said head is moved upwardly to loosen said drive belt, and adjustable means interengaging said supporting frame and said movably attaching means adjustably limiting downward movement of said grinding head toward said chain saw supporting means.

4. A chain saw grinder comprising a platform, means carried by said platform for supporting a chain saw, a base mounted on said platform for pivotal movement about an axis perpendicular to said platform, a supporting frame pivotally carried by said base for pivoting movement about an axis angularly related to the pivotal axis of said base, a grinding head disposed above said chain saw supporting means, means movably attaching said grinding head to said supporting frame for movement in a generally vertical direction toward and away from said chain saw supporting means, a pawl for engaging and positioning the teeth of the saw relative to the grinding head, and means carrying said pawl and adjustably mounted on said chain saw supporting means for selective positioning longitudinally of said chain saw supporting means to locate said pawl relative to a chain saw supported by said means according to the teeth of the chain saw.

5. A chain saw grinder comprising a platform, means carried by said platform for supporting a chain saw, a base mounted on said platform for pivotal movement about an axis perpendicular to said platform, a supporting frame pivotally carried by said base for pivoting movement about an axis angularly related to the pivotal axis of said base, a grinding head disposed above said chain saw supporting means, means movably attaching said grinding head to said supporting frame for movement in a generally vertical direction toward and away from said chain saw supporting means, said movably attaching means comprising vertically spaced, parallel links projecting forwardly from said supporting frame, and pivotally attached at their rear ends to said supporting frame, a secondary frame member pivotally attached at spaced points along the length thereof to the free ends of said links, said grinding head being carried at the lower end of said secondary frame member.

6. A chain saw grinder comprising a platform, means carried by said platform for supporting a chain saw, a base mounted on said platform for pivotal movement about an axis perpendicular to said platform, a supporting frame pivotally carried by said base for pivoting movement about an axis angularly related to the pivotal axis of said base, a grinding head disposed above said chain saw supporting means, means movably attaching said grinding head to said supporting frame for movement in a generally vertical direction toward and away from said chain saw supporting means, said movably attaching means comprising vertically spaced, parallel links projecting forwardly from said supporting frame, and pivotally attached at their rear ends to said supporting frame, a secondary frame member pivotally attached at spaced points along the length thereof to the free ends of said links, said grinding head being carried at the lower end of said secondary frame member, a driving motor fixedly carried on said frame and having a drive shaft pulley wheel, said grinding head including a grinding wheel keyed to a driven shaft, a pulley wheel keyed to said shaft, and a drive belt entrained over said pulley wheels, a belt guide fixedly attached to said frame, said belt guide frictionally engaging said belt as said grinding head is moved upwardly away from said chain saw supporting means stopping movement of said belt.

7. The combination of claim 6 including a pawl carried by said chain saw supporting means for maintaining each tooth of a saw in position beneath said grinding head.

References Cited in the file of this patent

UNITED STATES PATENTS

| | | |
|---|---|---|
| 1,193,643 | Wardwell | Aug. 8, 1916 |
| 1,453,765 | Octave | May 1, 1923 |
| 1,874,315 | Laurent | Aug. 30, 1932 |
| 2,547,553 | Battocchi | Apr. 3, 1951 |
| 2,589,165 | Tey et al. | Mar. 11, 1952 |

FOREIGN PATENTS

| | | |
|---|---|---|
| 27,637 | Finland | Apr. 12, 1955 |